United States Patent [19]

Dudley

[11] Patent Number: 5,388,682
[45] Date of Patent: Feb. 14, 1995

[54] DIVERTER FOR DIVERTING ARTICLES TRANSPORTED ALONG A CONVEYOR BELT

[75] Inventor: David E. Dudley, San Jose, Calif.

[73] Assignee: Peco Controls Corporation, Milpitas, Calif.

[21] Appl. No.: 200,471

[22] Filed: Feb. 23, 1994

[51] Int. Cl.6 ............................................. B65G 47/46
[52] U.S. Cl. .................... 198/367; 198/442; 198/438
[58] Field of Search ............... 198/367, 370, 372, 437, 198/442, 493, 438

[56] References Cited

U.S. PATENT DOCUMENTS

| | | | |
|---|---|---|---|
| 2,610,748 | 9/1952 | Larham | 198/367 |
| 3,465,870 | 9/1969 | Paulsen | 198/367 |
| 4,321,994 | 3/1982 | Heuft | 198/367 |
| 4,880,103 | 11/1989 | Ludwig et al. | 198/442 |

*Primary Examiner*—Joseph E. Valenza
*Attorney, Agent, or Firm*—Thomas E. Schatzel

[57] ABSTRACT

An article diverter for changing the conveyor path of successive conveyed articles from a single succession to at least two successions of articles. The diverter includes actuators positioned adjacent to one conveyor path but on opposite sides of the conveyor path. A flexible terminal end of one actuator is moveable, across the conveyor path to end adjacent to the flexible terminal end of another actuator when said ends are compressed. Each of the flexible terminal ends are directed towards the center of the first conveyor path when compressed. The flexible terminal ends are connected to piston rods which are retractable and extendable responsive to a control signal. The two actuators contain a member to hold their terminal end parallel to the conveyor path when the rod is extended and in a second position which intersects the conveyor path when the rods are retracted. When the ends of the two actuators intersect the conveyor path, articles contacting the actuators are diverted to a second path.

18 Claims, 2 Drawing Sheets

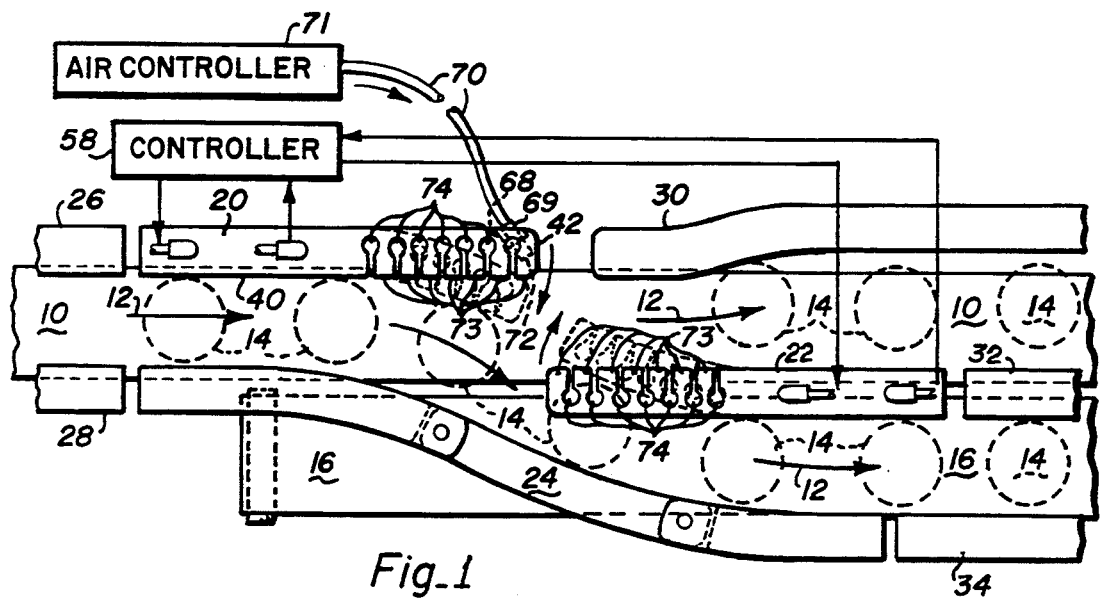
Fig_1
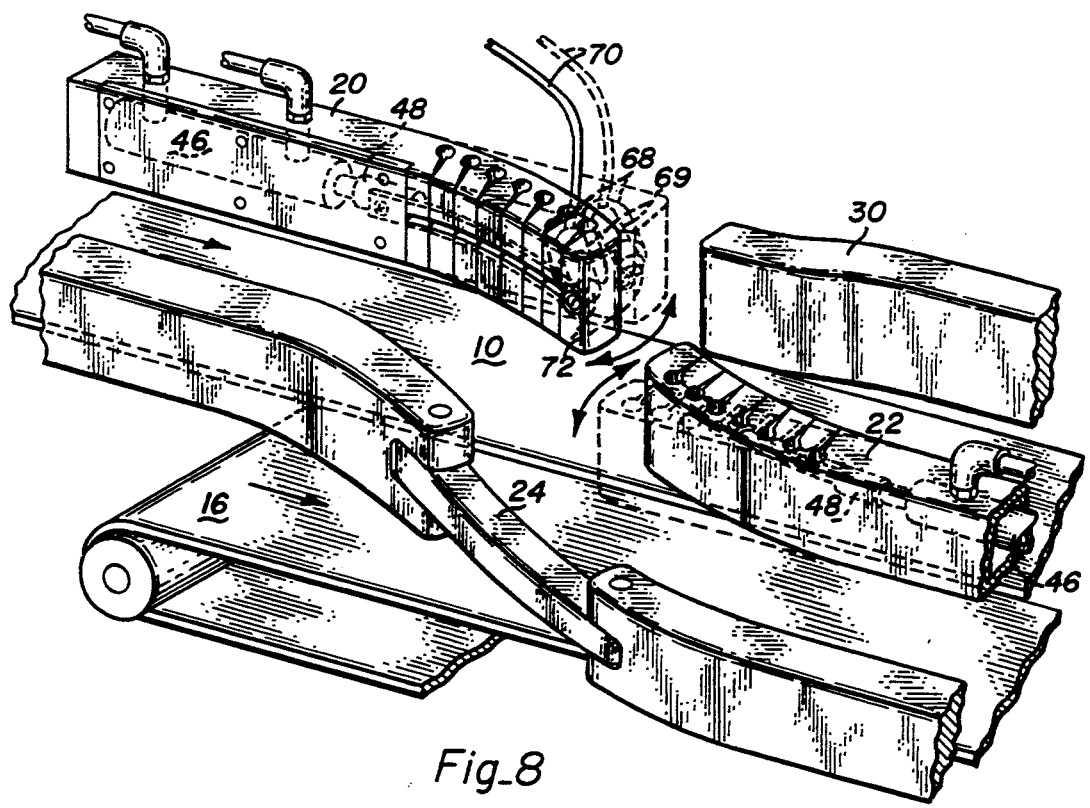
Fig_8

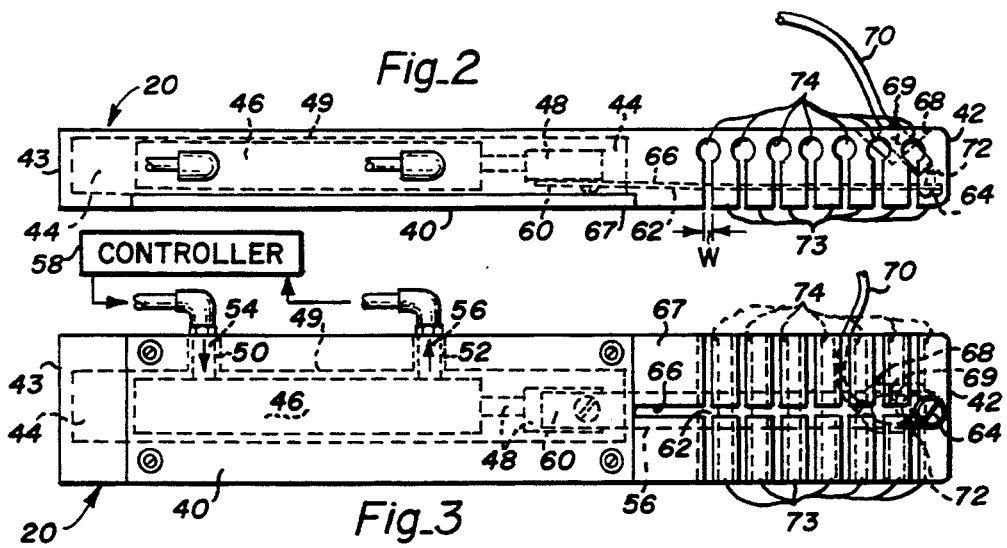
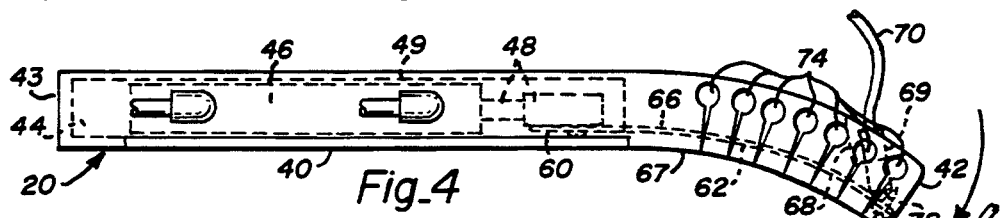
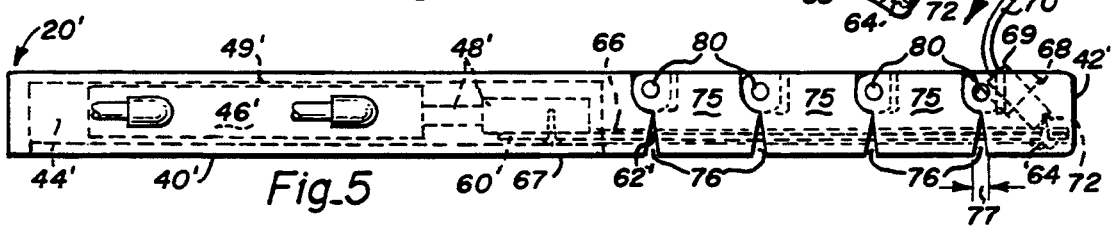
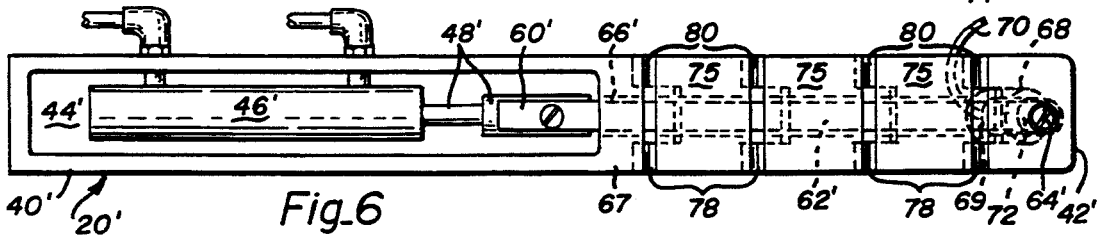
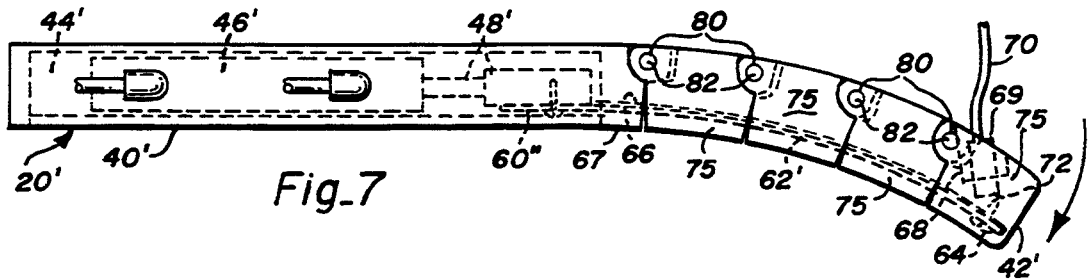

DIVERTER FOR DIVERTING ARTICLES TRANSPORTED ALONG A CONVEYOR BELT

BACKGROUND OF THE INVENTION

1. Filed of the Invention

This invention relates generally to a diverter for diverting articles transported along a conveyor path. More particularly, but not by way of limitation, this invention relates to a diverter of articles, e.g. bottles or cans, moving along a single conveyor path in a first succession, and redirecting said first succession to at least two successions of articles by interposing two actuators over opposite sides of the conveyor path, where the actuators contact chosen articles and divert the contacted articles to a second succession.

2. Description of the Prior Art

It is often desirable to divert articles from one conveyor path to another. For example, in a bottling plant facility, filled bottles are inspected for various reasons while in motion. It is necessary to inspect each bottle to make certain that it is properly capped; that the content capacity is correct; that the content is void of foreign objects, etc. When a bottle is detected that does not satisfy the inspection standards, it is desireable to divert that bottle from the train of acceptable bottles without interruption of the conveyor or progression of acceptable bottles. There are numerous other applications for diverting articles from one conveyor to another. Previously, diverter guides have been interposed in the path of a single succession of articles to form at least two successions of articles. However, diverting articles traveling along one conveyor path to another path needs to be accomplished rapidly, smoothly without contact between a diverted article and successive article, and without substantially interrupting the travel speed of the successive article.

SUMMARY OF THE PRESENT INVENTION

It is therefore an object of the present invention to provide a diverter to divert articles from one conveyor path to another path.

It is another object of the present invention to provide a diverter to divert articles from one conveyor path to another path without an article contacting another article.

It is another object of the present invention to provide a, diverter to divert articles from a first succession while the rate of travel of the first succession remains constant.

It is another object of the present invention to provide a diverter to divert articles from a first succession without damaging said articles.

Briefly, a preferred embodiment of the present invention includes an article diverter which changes the conveyor path of successive conveyed articles from a single succession to at least two successions of articles. The article diverter includes two actuators positioned adjacent to one conveyor path but on opposite sides of the conveyor path. Each actuator has a flexible terminal end with the flexible terminal end of the first actuator ending at a point along the conveyor path corresponding to the end of the flexible terminal end of the second actuator. Upon actuation, each of the flexible terminal sides are directed towards the center of the first conveyor path with the terminal ends in alignment. The flexible terminal ends are connected to a piston rod which retracts and extends in response to a control signal. The two actuators each contain means to hold their respective terminal end in a first position parallel to the conveyor path and in a second position which intersects the conveyor path. When the two actuators intersect the conveyor path the terminal ends of the two actuators are aligned and articles contacting the actuators are diverted to a second path along the second actuator.

An advantage of the present invention is that it provides a diverter which redirects articles from one conveyor path to another path.

Another advantage of the present invention is that it provides a diverter that redirects articles from one conveyor path to another path without an article contacting another article.

Another advantage of the present invention is that it provides a diverter that redirects articles from a first succession while the rate of travel of the first succession remains constant.

Another advantage of the present invention is that it provides a diverter that redirects articles from a first succession without damaging said articles.

These and other objects and advantages of the present invention will no doubt become obvious to those of ordinary skill in the art after having read the following detailed description of the preferred embodiment which is illustrated in the various drawing figures.

BRIEF DESCRIPTION OF THE DRAWINGS

FIG. 1 is a top view of a diverter mechanism of the present invention incorporated with two conveyor belts each transporting a separate succession of articles;

FIG. 2 is a top view of an actuator of FIG. 1 with serrations about one end;

FIG. 3 is a front side view of the actuator of FIG. 2;

FIG. 4 is a top view of the actuator of FIG. 2 with the serrations compressed to form a curved path;

FIG. 5 is a top view of an alternative actuator with a plurality of individual links about one end;

FIG. 6 is a front view of the actuator of FIG. 5;

FIG. 7 is a top view of the actuator of FIG. 5 with the individual links compressed to form a curved path; and FIG. 8 is a perspective view of two contracted actuators of FIGS. 2-4 for diverting an article from a succession of articles on a first conveyor belt to a second conveyor belt.

DETAILED DESCRIPTION OF THE PREFERRED EMBODIMENT

FIG. 1 shows a first conveyor belt 10 movable in the direction of an arrow 12 for transporting a single succession of articles 14, e.g. bottles or cans. A second conveyor belt 16, movable in the same direction is positioned parallel to the conveyor belt 10 for transporting a second succession of articles 14. A first actuator 20 is positioned parallel to the conveyor belt 10, a second actuator 22 is positioned parallel to and between both conveyor belts 10 and 16, and an article guide rail 24 is positioned acutely above the second conveyor belt 16. Upstream from the actuator 20 and rail 24, articles 14 are guided by a pair of upstream straight rails 26 and 28 positioned parallel to and over each of the first conveyor belt 10 edges. The first succession of articles 14 on the conveyor belt 10 are guided on one side by the actuator 20 and a downstream rail 30, and on a second side by the actuator 22 and a center downstream rail 32. The two actuators 20 and 22 and the two downstream rails 30 and 32, are positioned parallel to and about the edges of the conveyor belt 10.

Articles 14 diverted from the conveyor belt 10 to conveyor belt 16 make up the second succession of articles 14. Diverted articles 14 are diverted on a first path side by the actuator 20 when the actuator 20 responds to a control signal, and the end compresses to form a concave arc extending over the first conveyor path 10. Simultaneously, the actuator 22 responds to the control signal, and compresses to form a convex arc extending over the first conveyor path 10 and in alignment with the concave arc formed by the compressed actuator 20. The concave arc of the actuator 20 and the convex arc of actuator 22 are illustrated in FIG. 1 by dashed lines interposed in the path of the first succession. A second path side contains the article guide rail 24 which includes a curvature path parallel and consistent with the arc's formed by actuators 20 and 22 and spaced from actuators 20 and 22 to readily accept the diverted articles 14. After articles 14 are diverted to the second succession on conveyor belt 16, the center downstream rail 32 and a second downstream straight rail 34, positioned parallel to and over opposite edges of belt 16, guide the articles 14.

As illustrated in FIGS. 2–4 each of the actuators 20 and 22 include a front elongated guide member 40 of rectangular cross-section. The member 40 is of a plastic material and includes a flexible segment about a first terminal end 42. Intermediate the end 42 and a terminal end 43, is a cavity 44 to receive a pneumatic or hydraulic cylinder 46 having a retractable elongated piston 48 extending from the cylinder 46 towards the first terminal end 42. About. a top wall 49 of the cavity 44 and communicating through to the exterior of the member 40 are a pair of openings 50 and 52. The openings 50 and 52 each accommodate a conduit 54 and 56 respectively, attached to the cylinder 46 such that pressurized air or liquid may be supplied to and extracted from the cylinder 46 responsive to a controller 58.

The piston 48 is connected to a first terminal end 60 of an elongated flexible metal arm 62. A second terminal end 64 of the arm 62 is attached to the member 40 about terminal end 42. The flexible arm 62 fits within a longitudinal opening 66 that extends through the member 40 from the cavity 44 to the terminal end 42. The opening 66 is positioned intermediate the longitudinal center of the member 40 and a lateral wall 67 of the member 40.

Positioned about the area where the lateral wall 67 intersects the terminal end 42 of the member 40 is an opening 68 at an acute angle relative to the longitudinal center of the member 40. Within the opening 68 is a nozzle 69 attached to a conduit 70. When the article 14 is to be diverted, an air control signal 71 activates and releases compressed air into the conduit 70. The compressed air travels through the conduit 70, nozzle 69, and out an opening 72 in the nozzle 69. The compressed air is activated in conjunction with the actuator 20 forming a concave arc extending over the first conveyor path 10. The released compressed air and the actuator 20 urges the article 14 that is to be diverted from the first conveyor belt 10, towards the second conveyor belt 16.

Referring to FIGS. 2–4, the member 40 about the terminal end 42 is formed into a series of intermediate successive serrations 73. The serrations 73 are formed by a plurality of cuts 74 which extend through the longitudinal center of the member 40, and widen near a lateral wall 75 of the member 40 to create flexibility of the member 40 about the flexible terminal end 42. Responsive to the pressure in the cylinder 46, the piston 48 retracts towards the cylinder 46 and thereby retracts the attached flexible arm 62 through the opening 66 and towards the cylinder 46. Because the cuts 74 open to the lateral side 67, and the arm 62 is located off the longitudinal center of the member 40 towards the side 67, as the arm 62 retracts, the serrations compress upon one another and form a curvature as shown in FIG. 4. The arm 62 may retract a maximum amount dictated by the serrations 73 closing upon themselves as illustrated in FIG. 4. The degree of curvature is determined by the width W of the cuts 74 along the lateral side 67 and by the amount of retraction of piston 48 within the cylinder 46. This in turn is controlled by the control signals received from the controller 58. Thus, assuming the installation includes conveying bottles, if a detector detects a bottle that is to be diverted, a sensor transmits a signal to the controller 58 which in turn operates the cylinder 46. In turn the piston 48 and arm 62 are retracted such that the member 40 forms the concave arm over the conveyor belt 10 as illustrated in FIG. 1. With the two actuators 20 and 22 positioned as illustrated in FIG. 1, the concave path of the actuator 20 and convex path of the actuator 22 forms a continuous guide path from the conveyor 10 to conveyor 16.

An alternative embodiment of the elongated member 40 for the actuators 20 and 22 is illustrated in FIGS. 5–7. In FIGS. 5–7, all elements similar to those of FIGS. 1–4 carry the same reference numeral distinguished by a prime designation. In this embodiment, the member 40' includes a plurality of individual links 75 along the terminal end 42'. Each link 75 includes tapered sides 76 which form gaps 77 between each adjacent link 75. The arm 62' extends through each link 75 and is located as previously described. Each link 75 has a pair of openings 78 and 80 in opposite rear sides for receipt of an elongated pin 82 to interconnect the links 75 while allowing the adjoining links 75 to pivot relative to its connected pin 82 and adjacent link 75. As shown in FIG. 7, retraction of the arm 62' causes compression of the links 75 until the gaps 77 close about the lateral wall 67 to form a concave surface internally and convex wall externally. The curvature along the compressed links 75 is determined by the width "w" of the gaps 77 between the adjoining links 75.

From the foregoing description, and as illustrated in FIGS. 1 and 8, the actuator 20 and the actuator 22 combine to divert an article 14 from a first succession on top of conveyor path 10, to at least a second succession of articles 14 continuing on top of conveyor belt 16. At rest, the actuators 20 and 22 are parallel to and above the edges of the conveyor belt 10. To divert articles 14 traveling along the first succession, the actuators 20 and 22 are controlled to intersect the first succession's path by compressing their terminal ends 42. The terminal end 42 of both actuators 20 and 22 compress when the arm 62 retracts. The arm 62 retracts when the piston 48 is retracted within cylinder 46. Cylinder 46 retracts responsive to air or hydraulic pressure through the two conduits 54 and 56 in response to a control signal from the controller 58. Pneumatic or hydraulic pressure is preferred because the two actuators 20 and 22 need to respond rapidly to divert an article 14 from the first path without contacting or impeding the first succession of articles 14.

Although the present invention has been described in terms of the presently preferred embodiment, it is to be understood that such disclosure is not to be interpreted as limiting. Various alternations and modifications will no doubt become apparent to those skilled in the art after reading the above disclosure. Accordingly, it is intended that the appended claims be interpreted as covering all alterations and modifications as fall within the true spirit and scope of the invention.

I claim:

1. A diverter for changing the conveyor path of successive conveyed articles from a single succession of articles to at least two successions of articles, said diverter comprising:

a first actuator positioned adjacent to one conveyor path for a single succession of articles and with means to hold an arm of the actuator in a first position adjacent to said one path and in a second position which intersects with said one path;

the first actuator including a first elongated guide member with a first flexible segment about one terminal end, said first flexible segment being connected to a first piston retractable and extendable responsive to a control signal, said first flexible segment being in a straight line with said first piston extended and forming a first concave arc over said one conveyor path when said first piston is retracted.

2. The diverter of claim 1 further including a second actuator positioned adjacent to said one conveyor path and a second path with said second path being parallel to said one path and for receiving a second succession of articles diverted from said one conveyor path; and the second actuator including a second elongated guide member with a second flexible segment about one terminal end, said second flexible segment being connected to a second piston which retracts and extends responsive to said control signal, said second flexible segment being in a straight line with said second piston extended and forming a convex arc over said one conveyor path as said second piston retracts with said convex arc being aligned with said first concave arc formed by said first actuator, whereby a direction of travel of a conveyed article is changed from said first conveyor path to said second path.

3. The diverter of claim 2 wherein said second path is a conveyor path movable parallel to said one conveyor path.

4. The diverter of claim 1 wherein said first flexible segment includes serrations about said one terminal end with gaps intermediate successive serrations and with said serrations connected to said first piston, whereby as said first piston retracts said serrations compress relative to one another to reduce said gap and form said concave arc.

5. The diverter of claim 1 wherein the first flexible segment includes an elongated rail with a plurality of individual links about said one end, each of said links being locked to an adjoining one of said links and pivotable relative thereto, and with said links connected to said first piston, whereby as said first piston retracts said links rotate relative to one another to form said concave arc.

6. The diverter of claim 2 wherein said first flexible segment includes serrations about said one terminal end with gaps intermediate successive serrations and with said serrations connected to said first piston, whereby as said first piston retracts said serrations compress relative to one another to form said concave arc.

7. The diverter of claim 2 wherein the first actuator includes an elongated rail with a plurality of individual links about said one end, each of said links being locked to an adjoining one of said links and pivotable relative thereto, and with said links connected to said first piston, whereby as said first piston retracts said links rotate relative to one another to form said concave arc.

8. The diverter of claim 6 wherein the second flexible segment includes an elongated rail with serrations about one end and gaps intermediate successive serrations with said serrations connected to said second piston, whereby as said second piston retracts, said serrations compress relative to one another to form said convex arc.

9. The diverter of claim 7 wherein the second actuator includes an elongated rail with a plurality of individual links about said one end each of said links being locked to an adjoining one of said links and pivotable relative thereto, and with said links connected to said second piston, whereby as said second piston retracts, said links compress relative to one another to form said convex arc.

10. The diverter of claim 1 wherein the first actuator includes a first pneumatic or hydraulic cylinder with said first piston extending from within a pneumatic or hydraulic chamber of said first cylinder.

11. The diverter of claim 5 wherein the first actuator includes a first pneumatic or hydraulic cylinder with said first piston extending from within a pneumatic or hydraulic chamber of said first cylinder; and said elongated rail includes a cavity about a second end and with said chamber of said first cylinder positioned within said cavity.

12. The diverter of claim 1 wherein said first piston includes a first flexible arm extension, said first arm extension being flexible and forming an arc conforming to said first concave arc as said first piston retracts.

13. The diverter of claim 2 further including a rail parallel with said second path which guides said second succession of articles from said first path and along said second path.

14. The diverter of claim 13 wherein said rail is of a curvature parallel and consistent with said first concave arc, and continuing along a path parallel and consistent with said second convex arc, and said rail is of a distance from said first actuator and said second actuator for readily accepting said diverted articles along said second path.

15. The diverter of claim 10 further including a second actuator positioned adjacent to said one conveyor path and a second path with said second path being parallel to said one path and for receiving a second succession of articles diverted from said one conveyor path;

the second actuator including a second elongated guide member with a second flexible segment about one terminal end, said second flexible segment being connected to a second piston which retracts and extends responsive to said control signal, said second flexible segment being in a straight line with said second piston extended and forming a convex arc over said one conveyor path as said second piston retracts with said convex arc being aligned with said first concave arc formed by said first actuator, whereby a direction of travel of a conveyed article is changed from said first conveyor path to said second path; and wherein the second actuator includes a second pneumatic or hydraulic cylinder with said second piston extending from within a pneumatic or hydraulic chamber of said second cylinder.

16. The diverter of claim 15 wherein the second actuator includes a second pneumatic or hydraulic cylinder with said second piston extending from within a pneumatic or hydraulic chamber of each second cylinder; and said elongated guide member includes a second cavity about a second end and with said chamber of said second cylinder positioned within said second cavity.

17. The diverter of claim 2 wherein said first piston extension is engaged to said first flexible segment and flexible to form an arc conforming to said first concave arc as said first piston retracts; and said second piston extension is engaged to said second flexible segment, and flexible to form an arc conforming to said second convex arc as said second piston retracts.

18. The diverter of claim 1 wherein a conduit attached to a nozzle and positioned about said terminal end of said first actuator at an acute angle relative to the longitudinal center of said first actuator, said conduit and said nozzle guides compressed air responsive to an air control signal which releases compressed air to said conduit when said actuator is activated to divert said article.

* * * * *